United States Patent
Charipadi et al.

(10) Patent No.: US 11,388,618 B2
(45) Date of Patent: Jul. 12, 2022

(54) DISTRIBUTED RADIO ACCESS NETWORK IMPLEMENTING FRONTHAUL OPERATIONAL MEASUREMENTS

(71) Applicant: CommScope Technologies LLC, Hickory, NC (US)

(72) Inventors: Gopikrishna Charipadi, Bangalore (IN); Nandish Chalishazar, Nashua, NH (US); Vijayaraghavan Krishnaswamy, Bengaluru (IN); Irfaan Ahamed Salahuddeen, Acton, MA (US)

(73) Assignee: CommScope Technologies LLC, Hickory, NC (US)

( * ) Notice: Subject to any disclaimer, the term of this patent is extended or adjusted under 35 U.S.C. 154(b) by 49 days.

(21) Appl. No.: 16/865,862

(22) Filed: May 4, 2020

(65) Prior Publication Data
US 2020/0389806 A1   Dec. 10, 2020

Related U.S. Application Data

(60) Provisional application No. 62/858,051, filed on Jun. 6, 2019.

(51) Int. Cl.
*H04W 24/10* (2009.01)
*H04W 24/08* (2009.01)

(52) U.S. Cl.
CPC ........... *H04W 24/10* (2013.01); *H04W 24/08* (2013.01)

(58) Field of Classification Search
CPC .............................. H04W 24/10; H04W 24/08
See application file for complete search history.

(56) References Cited

U.S. PATENT DOCUMENTS

| 2014/0212129 A1* | 7/2014 | Huang | H04B 10/25 398/2 |
| 2015/0036533 A1* | 2/2015 | Sodhi | H04L 41/12 370/253 |
| 2017/0251430 A1 | 8/2017 | Sarjoui et al. | |
| 2019/0037421 A1 | 1/2019 | Eyuboglu et al. | |

(Continued)

OTHER PUBLICATIONS

Chen et al. "A Mobility Management Using Follow-Me Cloud-Cloudlet in Fog-Computing-Based RANs for Smart Cities"; Published in Sensors 2018; Published on Feb. 6, 2018; pp. 1 through 26.

(Continued)

*Primary Examiner* — Zhiren Qin
(74) *Attorney, Agent, or Firm* — Fogg & Powers LLC

(57) ABSTRACT

A distributed radio access network (RAN) includes a plurality of radio points (RPs), each being configured to exchange radio frequency (RF) signals with at least one user equipment (UE). The distributed RAN also includes a baseband controller communicatively coupled to the plurality of RPs via a fronthaul network. The baseband controller is configured to determine, for each of the plurality of RPs, a number of successfully received packets on the fronthaul network, for a wireless channel, during a measurement interval. The baseband controller is also configured to determine, for each of the plurality of RPs, a number of packet losses (reflecting dropped and/or delayed packets), for the wireless channel and during the measurement interval, based on the number of successfully received packets.

22 Claims, 5 Drawing Sheets

(56) References Cited

U.S. PATENT DOCUMENTS

2019/0104527 A1    4/2019  Raghothaman et al.
2019/0208575 A1*   7/2019  Barbieri .............. H04W 88/085
2020/0296019 A1*   9/2020  Medeiros ............ H04L 43/0829
2021/0112453 A1*   4/2021  Nguyen ................ H04L 5/0055

OTHER PUBLICATIONS

Han et al. "On the Effect of Fronthaul Latency on ARQ in C-RAN Systems" Retrieved on Jul. 31, 2020 from ; pp. 1 through 12.
International Searching Authority, "International Search Report and Written Opinion from PCT Application No. PCT/US2020/031305 dated Aug. 13, 2020", From PCT Counterpart of U.S. Appl. No. 16/865,862; pp. 1 through 9; Published in: WO.
O-RAN Alliance Working Group 4, Management Plane Specifications, ORAN-WG4.MP.0-v01.00, 2019, pp. 1 through 125.
O-RAN Fronthaul Working Group, "Control, User and Synchronization Plane Specification", ORAN-WG4. CUS.0-v01.00, 2019, pp. 1 through 189.

* cited by examiner

DISTRIBUTED RADIO ACCESS NETWORK IMPLEMENTING FRONTHAUL OPERATIONAL MEASUREMENTS

CROSS-REFERENCE TO RELATED APPLICATIONS

This application claims priority to U.S. Provisional Patent Application No. 62/858,051 entitled "DISTRIBUTED RADIO ACCESS NETWORK IMPLEMENTING FRONTHAUL OPERATIONAL MEASUREMENTS" filed on Jun. 6, 2019, which is incorporated by reference in its entirety.

BACKGROUND

In a distributed radio access network (RAN), geographically-separate remote units may provide wireless service to user equipment (UEs). In a distributed RAN, a controller unit may communicate with the remote units via a fronthaul network. It may be desirable to implement fronthaul operational measurements in a distributed RAN in order to monitor the fronthaul network.

SUMMARY

A distributed radio access network (RAN) includes a plurality of radio points (RPs), each being configured to exchange radio frequency (RF) signals with at least one user equipment (UE). The distributed RAN also includes a baseband controller communicatively coupled to the plurality of RPs via a fronthaul network. The baseband controller is configured to determine, for each of the plurality of RPs, a number of successfully received packets on the fronthaul network, for a wireless channel, during a measurement interval. The baseband controller is also configured to determine, for each of the plurality of RPs, a number of packet losses (reflecting dropped and/or delayed packets), for the wireless channel and during the measurement interval, based on the number of successfully received packets.

DRAWINGS

Understanding that the drawings depict only exemplary configurations and are not therefore to be considered limiting in scope, the exemplary configurations will be described with additional specificity and detail through the use of the accompanying drawings, in which.

Figure 1:
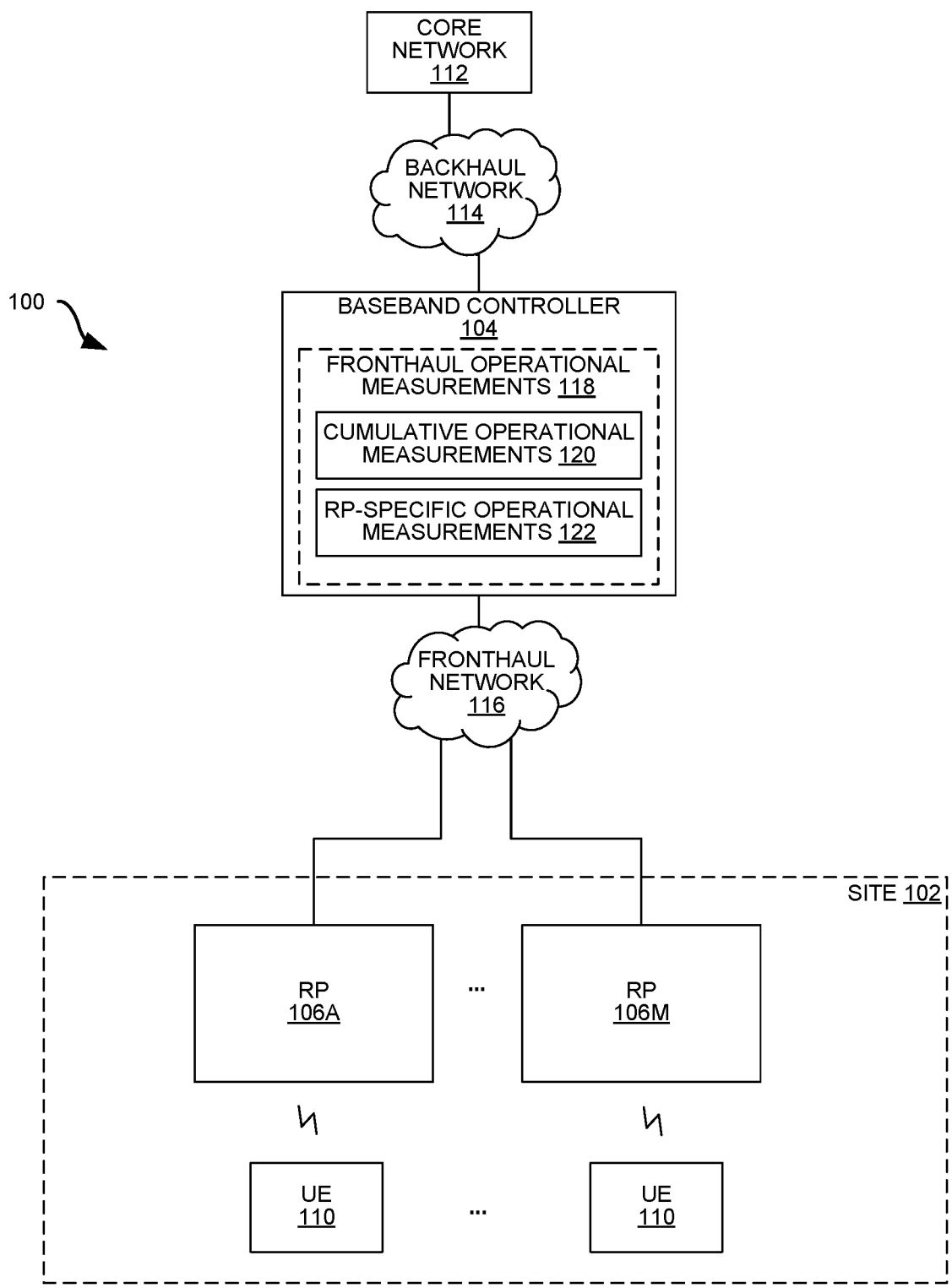
FIG. 1 is a block diagram illustrating an exemplary configuration for load-testing a distributed radio access network (RAN) implementing fronthaul operational measurements (OMs)

In accordance with common practice, the various described features are not drawn to scale but are drawn to emphasize specific features relevant to the exemplary configurations.

DETAILED DESCRIPTION

A cloud radio access network (C-RAN) is one way to implement a distributed RAN. Typically, for each cell implemented by a C-RAN, one or more baseband controllers interact with multiple remote units (also referred to here as "radio points" or "RPs") in order to provide wireless service to various items of user equipment (UEs). In a C-RAN, the RPs may communicate with at least one controller via a fronthaul network. The fronthaul network may include at least one computing device (e.g., switch) that facilitates communication between the RPs and baseband controller. For example, the fronthaul network may be implemented using at least one ETHERNET switch. In addition, the fronthaul network may be implemented using different physical links, e.g., copper, multi-rate, multi-mode cables, etc.

Service providers have obligations to provide a certain level of wireless service to its customers. These obligations may be described in service level agreements (SLAs), which impose requirements on the wireless service in terms of key performance indicators (KPIs), e.g., throughput, block error rate (BLER), connection drop rates, etc. However, many factors can contribute to KPI degradations in actual deployments. For example, the link bandwidth of various connections in the fronthaul network or the particular switch configuration used in the fronthaul network may negatively affect the packet traffic (and therefore, key performance indicators (KPI)) in unique ways that are difficult to diagnose and correct.

As described below, the present systems and methods may implement a variety of metrics called fronthaul operational measurements (OMs), updated at least every measurement interval, in a distributed RAN in order to monitor the fronthaul network. This ability to monitor the operation of the fronthaul network enables service providers the ability to meet their obligations outlined in service level agreements (SLAs). Specifically, the fronthaul OMs described herein can be used to identify and correct performance problems in a C-RAN, such as low throughput, high BLER, high packet loss, etc.

As described herein, an aggregation interval may be a unit of time (e.g., 100 radio frames of 10 msec each=1 second) during which downlink packets received by an RP, as well as the uplink packets transmitted by the RP, are accumulated at the RP and transmitted to the baseband controller as a set of counters, one for each wireless channel for which fronthaul OMs are maintained (e.g., PRACH, PUCCH, PUSCH, SRS, PDCCH, and PDSCH), in a heartbeat message in the subsequent aggregation interval. This process continues every aggregation interval. When the baseband controller receives the heartbeat message during aggregation interval N+1, it will add the counts (relating to aggregation interval N) for each channel and each RP to the running counts maintained for each channel and each RP during the present measurement interval. At the boundary of the measurement interval (e.g., 15 minutes) the loss count and success count for each channel and each RP is determined and recorded as a loss RP-specific OM and a success RP-specific OM for the just-completed measurement interval, which can be stored and/or displayed to a user. This process is repeated in the baseband controller every measurement interval for multiple (e.g., all) RPs and for one or more wireless channels. The length of the measurement interval may be configurable, e.g., by a user of the baseband controller. Cumulative OMs may be determined for each channel and each measurement interval, by summing the corresponding RP-specific OMs across all RPs during the measurement interval.

C-RAN Overview

FIG. 1 is a block diagram illustrating an exemplary configuration of a distributed radio access network (RAN) system 100 implementing fronthaul operational measurements (OMs) 118. In the exemplary configuration shown in FIG. 1, the system 100 is implemented using the cloud radio access network (C-RAN) (point-to-multipoint distributed base station) architecture that employs at least one baseband unit 104 and multiple (e.g., M=32, 64, etc.) radio points (RPs) 106A-M that serve at least one cell.

The RPs 106 may be deployed at a site 102 to provide wireless coverage and capacity for one or more wireless network operators. The site 102 may be, for example, a building or campus or other grouping of buildings (used, for example, by one or more businesses, governments, other enterprise entities) or some other public venue (such as a hotel, resort, amusement park, hospital, shopping center, airport, university campus, arena, or an outdoor area such as a ski area, stadium or a densely-populated downtown area). In some configurations, the site 102 is at least partially (and optionally entirely) indoors, but other alternatives are possible.

The system 100 may also be referred to here as a "C-RAN" or a "C-RAN system." The baseband unit 104 is also referred to here as "baseband controller" 104, or just "controller" 104. Each RP 106 may include or be coupled to at least one antenna used to radiate downlink RF signals to user equipment (UEs) 110 and receive uplink RF signals transmitted by UEs 110. The baseband controller 104 may optionally be physically located remotely from the site 102, e.g., in a centralized bank of baseband controllers 104. Additionally, the RPs 106 may be physically separated from each other within the site 102, although they are each communicatively coupled to the baseband controller 104 via a fronthaul network 116.

Each UE 110 may be a computing device with at least one processor that executes instructions stored in memory, e.g., a mobile phone, tablet computer, mobile media device, mobile gaming device, laptop computer, vehicle-based computer, a desktop computer, etc. Each baseband controller 104 and RP 106 may be a computing device with at least one processor that executes instructions stored in memory.

The system 100 is coupled to a core network 112 of each wireless network operator over an appropriate backhaul network 114. For example, the Internet may be used for backhaul between the system 100 and each core network 112. However, it is understood that the backhaul network 114 can be implemented in other ways. Each of the backhaul network 114 and the fronthaul network 116 described herein may be implemented with one or more switches, routers, and/or other networking devices, e.g., the backhaul network 114 and/or the fronthaul network 116 may be implemented with a switched ETHERNET network. In some configurations, the switches within the fronthaul network 116 are daisy-chained, with some of the switches communicating with the baseband controller 104 only through another switch.

The system 100 may be implemented as a Long Term Evolution (LTE) radio access network providing wireless service using an LTE air interface. However, it should be noted that the present systems and methods may be used with other wireless protocols, e.g., the system 100 may be implemented as a 3GPP 5G RAN providing wireless service using a 5G air interface. LTE is a standard developed by the 3GPP standards organization. In this configuration, the baseband controller 104 and RPs 106 together are used to implement an LTE Evolved Node B (also referred to here as an "eNodeB" or "eNB"). An eNB may be used to provide UEs 110 with mobile access to the wireless network operator's core network 112 to enable UEs 110 to wirelessly communicate data and voice (using, for example, Voice over LTE (VoLTE) technology).

Also, in an exemplary LTE configuration, each core network 112 may be implemented as an Evolved Packet Core (EPC) 112 comprising standard LTE EPC network elements such as, for example, a mobility management entity (MME) and a Serving Gateway (SGW) and, optionally, a Home eNB gateway (HeNB GW) (not shown) and a Security Gateway (SeGW or SecGW) (not shown).

Moreover, in an exemplary LTE configuration, each baseband controller 104 may communicate with the MME and SGW in the EPC core network 112 using the LTE S1 interface and communicates with eNBs using the LTE X2 interface. For example, the baseband controller 104 can communicate with an outdoor macro eNB (not shown) via the LTE X2 interface.

Each baseband controller 104 and radio point 106 can be implemented so as to use an air interface that supports one or more of frequency-division duplexing (FDD) and/or time-division duplexing (TDD). Also, the baseband controller 104 and the radio points 106 can be implemented to use an air interface that supports one or more of the multiple-input-multiple-output (MIMO), single-input-single-output (SISO), single-input-multiple-output (SIMO), multiple-input-single-output (MISO), and/or beam forming schemes. For example, the baseband controller 104 and the radio points 106 can implement one or more of the LTE transmission modes. Moreover, the baseband controller 104 and the radio points 106 can be configured to support multiple air interfaces and/or to support multiple wireless operators.

In some configurations, IQ data representing pre-processed baseband symbols for the air interface is communicated between the baseband controller 104 and the RPs 106. Communicating such baseband IQ data typically requires a relatively high data rate front haul. The connections in and/or for the fronthaul network may be implemented using fiber or ETHERNET, where ETHERNET may be a more cost-effective option.

In some configurations, a baseband signal can be pre-processed at a source RP 106 and converted to frequency domain signals (after removing guard-band/cyclic-prefix data, etc.) in order to effectively manage the fronthaul rates, before being sent to the baseband controller 104. The RP 106 can further reduce the data rates by quantizing such frequency domain signals and reducing the number of bits used to carry such signals and sending the data. In a further simplification, certain symbol data/channel data may be fully processed in the source RP 106 itself and only the resultant information is passed to the baseband controller 104.

The Third Generation Partnership Project (3GPP) has adopted a layered model for the LTE radio access interface. Generally, some combination of the baseband controller 104 and RPs 106 perform analog radio frequency (RF) functions for the air interface as well as digital Layer 1 (L1), Layer 2 (L2), and Layer 3 (L3) (of the 3GPP-defined LTE radio access interface protocol) functions for the air interface. Any suitable split of L1-L3 processing (between the baseband controller 104 and RPs 106) may be implemented. Where baseband signal IQ data is fronthauled between the baseband controller 104 and the RPs 106, each baseband controller 104 can be configured to perform all or some of the digital L1, L2, and L3 processing for the air interface. In this case, the L1 functions in each RP 106 is configured to implement the digital L1 processing for the air interface.

Where the fronthaul ETHERNET network 116 is not able to deliver the data rate needed to front haul (uncompressed) time-domain IQ data, the time-domain IQ data can be compressed prior to being communicated over the ETHERNET network 116, thereby reducing the data rate needed communicate such IQ data over the ETHERNET network 116.

Data can be fronthauled between the baseband controller 104 and RPs 106 in other ways (for example, using fronthaul interfaces and techniques specified in the Common Public Radio Interface (CPRI) and/or Open Base Station Architecture Initiative (OB SAI) family of specifications).

Additionally, it should be noted that the present systems and methods may also be used in other distributed RANs (in addition to a C-RAN 100), e.g., a distributed antenna system (DAS).

Although not shown, a management system may be communicatively coupled to the baseband controller 104 and RPs 106, for example, via the backhaul network 114 and the fronthaul network 116 (in the case of the RPs 106). The management system may send and receive management communications to and from the baseband controller 104, each of which in turn forwards relevant management communications to and from the RPs 106.

Fronthaul Operational Measurements (OMs)

The performance of the C-RAN 100 may be quantified using various metrics, which may be referred to as key performance indicators (KPIs). For example, throughput (to and/or from UEs 110), block error rate (BLER), and connection drop rates may be used to characterize the health of the C-RAN 100. However, the performance of the C-RAN 100 may suffer for various reasons in a real-world deployment, e.g., bandwidth limitations between the baseband controller 104 and RPs 106, a particular switch configuration used in the fronthaul network 116, etc. Such problems may negatively affect the KPIs in unique ways that are difficult to diagnose and correct.

Accordingly, the C-RAN 100 may implement fronthaul operational measurements (OMs) 118 that enable the monitoring of packet traffic (between the baseband controller 104 and the RPs 106) over the fronthaul network 116. In addition to the monitoring, the fronthaul OMs 118 may enable the diagnosis and correction of problems that arise in the C-RAN 100.

Each fronthaul OM 118 may be a cumulative OM 120 or an RP-specific OM 122. Each RP-specific OMs 122 may track the number of certain types of packets for a particular RP 106 during a measurement interval and may be maintained in (e.g., stored in memory of) the baseband controller 104. Each cumulative OM 120 may be maintained in (e.g., stored in memory of) the baseband controller 104 and may track metrics across multiple (e.g., all) RPs 106 in the C-RAN 100 during a measurement interval.

Each RP-specific OM 122 may indicate a count, across a measurement interval (e.g., 15 minutes), of: (1) the number of successfully received and processed packets at the baseband controller 104 or a particular RP 106 (for a particular uplink or downlink channel); or (2) the number of packets lost during transit between the baseband controller 104 and a particular RP 106 (for a particular uplink or downlink channel). In the case of RP-specific OMs 122 indicating packet loss, the metric may optionally be expressed as a percentage instead of a count.

Each cumulative OM 120 may indicate a count, across a measurement interval (e.g., 15 minutes), of: (1) the number of successfully received and processed packets at the baseband controller 104 or at multiple (e.g., all) RPs 106 (for a particular uplink or downlink channel); or (2) the number of packets not received-and-processed or lost during transit between the baseband controller 104 and multiple (e.g., all) RPs 106 (for a particular uplink or downlink channel). In the case of cumulative OMs 120 indicating packet loss, the metric may optionally be expressed as a percentage (of total transmitted packets for the particular uplink or downlink channel during the measurement interval) instead of a count.

Each fronthaul OM 118 may correspond to a particular uplink or downlink channel. For example, at least two fronthaul OMs 118, for success and loss metrics, may be maintained for each of one or more uplink channels, e.g., one or more of the Sounding Reference Signal (SRS), Physical Random Access Channel (PRACH), Physical Uplink Control Channel (PUCCH), and/or Physical Uplink Shared Channel (PUSCH). Similarly, at least two fronthaul OMs 118, for success and loss metrics, may be maintained for each of one or more downlink channels, e.g., Physical Downlink Control Channel (PDCCH) and/or Physical Downlink Shared Channel (PDSCH).

Specifically, for every downlink channel for which fronthaul OMs 118 are maintained, the baseband controller 104 may peg (maintain) an RP-specific OM 122 (for each RP 106) that indicates a count of the packets transmitted to the respective RP 106 during a measurement interval. At each aggregation interval (e.g., one second), each RP 106 will send it's count (for the same downlink channel) indicating the number of packets successfully received from the baseband controller 104 (and processed) by the RP 106 during the previous aggregation interval. The counts of successfully-received packets for a particular RP 106 and channel may be accumulated across an entire measurement interval (e.g., 15 minutes) as a successfully-received-and-processed RP-specific OM 122.

The RPs 106 may receive some packets with a delay. However, due to the deterministic nature of the communication with the baseband controller 104, the RP 106 expects to receive packets for a particular channel in certain symbols within a subframe in order to not overrun the real-time processing. Accordingly, the delayed packets may be discarded (not processed) and the RP-specific OM 122 indicating successfully received and processed packets (associated with the downlink channel) is not incremented. In other words, downlink packets that are delayed (e.g., received in an unexpected symbol of an expected subframe (SF) of an LTE radio frame (SFN=System Frame Number)) are dropped/not processed by the receiving RP 106 (and the relevant count, indicating successfully received and processed packets, at the RP 106 is not incremented).

Each RP 106 may periodically send a heartbeat message to the baseband controller 104 during operation. Multiple (N) heartbeat intervals may occur within a single aggregation interval (e.g., one second). The baseband controller 104 will respond with a heartbeat message that is optionally accompanied by further operational instructions and/or configuration information for the RP 106. These heartbeat messages may also be used to communicate the fronthaul OMs 118 between the baseband controller 104 and the RPs 106. In some examples, counts maintained at an RP 106 for an aggregation interval are transmitted to the baseband controller 104 in heartbeat message, from the RPs 106 to the baseband controller 104, during the next aggregation interval.

In each measurement interval, the baseband controller 104 may then determine an RP-specific OM 122 (for the RP 106) indicating the number of packets lost or delayed while traversing the fronthaul network 116 (for a particular measurement interval and a particular downlink channel) by subtracting the successfully-processed RP-specific OM 122 (for the measurement interval and downlink channel) from the number of packets transmitted from the baseband controller 104 to the RP 106 (for the measurement interval and downlink channel).

The baseband controller 104 may also determine a cumulative OM 120 indicating the number of packets lost or delayed (for a particular downlink channel during a measurement interval) by summing the packet loss RP-specific OMs 122 for a measurement interval (each indicating the number of packet losses for a particular RP 106 and channel) across multiple RPs 106. The baseband controller 104 may also determine a cumulative OM 120 indicating the number of successfully received (and processed) packets by summing the successfully-received-and-processed RP-specific OMs 122 for a measurement interval (each indicating the number of successfully received and processed packets for a particular RP 106 and channel) across multiple RPs 106.

Similarly, for each uplink channel for which fronthaul OMs 118 are maintained, each RP 106 will peg (maintain) a counter indicating the number of packets transmitted from the RP 106 (during a measurement interval) to the baseband controller 104. Each RP 106 may transmit its respective counter(s) to the baseband controller 104 periodically, e.g., every aggregation interval in a heartbeat message. For each connected RP 106, the baseband controller 104 may maintain an RP-specific OM 122 indicating the number of successfully received (and processed) packets from the respective RP 106 (for the measurement interval and the uplink channel).

The baseband controller 104 may also determine (e.g., by summing the RP-specific OMs 122) a cumulative OM 120 that indicates the total number of uplink packets successfully received by the baseband controller 104 from all RPs 106, e.g., at their expected system frame number (SFN) and subframe (SF). Similar to the downlink, uplink packets that are delayed may be dropped or discarded (e.g., after parametric check of one or more parameters in the packet) by the baseband controller 104 and the relevant fronthaul OM(s) 118 (associated with the uplink channel) is/are not incremented at baseband controller 104.

For each tracked uplink channel, the baseband controller 104 may determine an RP-specific OM 122 indicating the packet loss for each RP 106. Each RP-specific OM 122 may be unique to a particular channel and measurement interval. To determine the RP-specific OM 122 indicating the packet loss for a particular RP 106, the baseband controller 104 may subtract (1) the RP-specific OM 122 indicating the number of packets successfully received (and processed) from the RP 106 (for the particular uplink channel and measurement interval); from (2) the counter indicating the number of packets transmitted by the RP 106 to the baseband controller 104 (for the particular uplink channel and measurement interval).

For each tracked uplink channel, the baseband controller 104 may also determine a cumulative OM 120 indicating the packet loss across all the RPs 106 (for a particular uplink channel) during a measurement interval that spans multiple aggregation intervals. For example, the baseband controller 104 may sum the RP-specific OMs 122 indicating the packet loss for each RP 106 (for a particular uplink channel) across the measurement interval. Alternatively, the baseband controller 104 may subtract (1) a cumulative OM 120 indicating the number of packets successfully received (and processed) from all RPs 106 (for the particular uplink channel and measurement interval); from (2) a total counter indicating the number of packets transmitted by all RPs 106 to the baseband controller 104 (for the particular uplink channel and measurement interval).

In some configurations, the fronthaul OMs 118 may be displayed (e.g., electronically on the baseband controller 104 and/or RPs 106), physically printed, and/or transmitted electronically to pre-determined personnel, e.g., associated with the operator of the C-RAN 100.

The fronthaul OMs 118 may be used to identify and/or correct performance problems in the C-RAN 100. In some configurations, the operator can first determine whether cumulative OMs 120 stored at the baseband controller 104 (and indicating packet loss and successfully received packets across all RPs 106 for a particular channel and measurement interval) are showing a value in an unexpected range, e.g., high total packet loss and/or low successfully received packets. If so, the operator may examine the RP-specific OMs 122 (indicating packet loss or successfully received packets for individual RPs 106) for a particular channel and measurement interval. Using the cumulative OMs 120 and/or the RP-specific OMs 122, the operator may determine if KPI degradations (e.g., throughput degradation, high BLER, connection drop rates, etc.) are caused by (or exacerbated by) issues in the fronthaul network 116, e.g., switch configurations, link bandwidth limitations, etc.

Example Fronthaul OMs

As described above, an RP-specific OM 122 may track the number of packets successfully received (e.g., in the expected SFN and SF) or lost for a particular uplink or downlink channel during a measurement interval, which may span multiple aggregation intervals, e.g., 15 minutes. RP-specific OMs 122 indicate counts for a specific RP 106 across a measurement interval. Cumulative OMs 120 indicate counts across multiple (e.g., all) connected RPs 106 across a measurement interval. The following are examples of fronthaul OMs 118 that may be maintained for a C-RAN 100. However, it is understood, that different derived fronthaul OMs could alternatively or additionally be maintained for a C-RAN 100, e.g., for derived uplink and/or downlink channels. Additionally, the RP-specific OMs 122 may be implemented using any suitable data structure (e.g., 64-bit datatype) in order to prevent unintended rollover from happening within a single measurement interval. The various fronthaul OMs 118 may be stored in performance logs for the baseband controller 104 and/or the RPs 106.

A Random Access Channel (RACH) success count metric (FHRACHPktSuccCount), stored in the baseband controller 104, indicates a number of RACH packets that were successfully received and processed by the baseband controller 104 within a particular measurement interval. This metric may be available as a cumulative OM 120 (where it indicates the total number of successfully received and processed RACH packets at the baseband controller 104, from all RPs 106, within the particular measurement interval); and/or RP-specific OM(s) 122 (each indicating the number of successfully received and processed RACH packets at the baseband controller 104, from an individual RP 106, within the particular measurement interval). Also, this metric may reset to 0 at start of each measurement interval (i.e., it is not cumulative across measurement intervals).

A Sounding Reference Signal (SRS) success count metric (FHSRSPktSuccCount), stored in the baseband controller 104, indicates a number of SRS packets that were successfully received and processed by the baseband controller 104 within a particular measurement interval. This metric may be available as a cumulative OM 120 (where it indicates the total number of successfully received and processed SRS packets at the baseband controller 104, from all RPs 106, within the particular measurement interval); and/or RP-specific OM(s) 122 (each indicating the number of successfully received and processed SRS packets at the baseband controller 104, from an individual RP 106, within the particular measurement interval). Also, this metric may reset to 0 at start of each measurement interval (i.e., it is not cumulative across measurement intervals).

A Physical Uplink Shared Channel (PUSCH) success count metric (FHPUSCHPktSuccCount), stored in the baseband controller 104, indicates a number of PUSCH packets that were successfully received and processed by the baseband controller 104 within a particular measurement interval. This metric may be available as a cumulative OM 120 (where it indicates the total number of successfully received and processed PUSCH packets at the baseband controller 104, from all RPs 106, within the particular measurement interval); and/or RP-specific OM(s) 122 (each indicating the number of successfully received and processed PUSCH packets at the baseband controller 104, from an individual RP 106, within the particular measurement interval). Also, this metric may reset to 0 at start of each measurement interval (i.e., it is not cumulative across measurement intervals).

A Physical Downlink Control Channel (PDCCH) success count metric (FHDLCCHPktSuccCount), stored in the baseband controller 104 and/or RPs 106, indicates a number of DLCCH packets that were successfully received and processed by the RP(s) 106 within a particular measurement interval. This metric may be available as a cumulative OM 120 (where it indicates the total number of successfully received and processed DLCCH packets, at all RPs 106, within the particular measurement interval) and/or an RP-specific OM 122 (where it indicates the number of successfully received and processed DLCCH packets, at an individual RP 106, within the particular measurement interval). Also, this metric may reset to 0 at start of each measurement interval (i.e., it is not cumulative across measurement intervals).

A Physical Downlink Shared Channel (PDSCH) success count metric (FHPDSCHPktSuccCount), stored in the baseband controller 104 and/or RPs 106, indicates the "intended" (directed to the closest RPs 106 serving UEs 110 located under it) number of PDSCH packets that were successfully received and processed by the RP(s) 106 within a particular measurement interval. For example, assume there are 3 RPs 106 in the C-RAN 100 with a first RP 106 receiving 10,000 intended packets, a second RP 106 receiving 15,000 intended packets, and a third RP 106 receiving 20,000 intended packets successfully within the particular measurement interval. If the metric is determined as a cumulative OM 120 (where it indicates the intended number of PDSCH packets, at all RPs 106, within the particular measurement interval), then this metric shall be calculated as the sum total of 45,000 packets. This metric may additionally, or alternatively, be available as RP-specific OM(s) 122 (each indicating the intended number of PDSCH packets, at an individual RP 106, within the particular measurement interval). Also, this metric (FHPDSCHPktSuccCount) may reset to 0 at start of each measurement interval (i.e., it is not cumulative across measurement intervals).

A Physical Uplink Control Channel (PUCCH) success count metric (FHPUCCHPktSuccCount), stored in the baseband controller 104, indicates a number of PUCCH packets that were successfully received and processed by the baseband controller 104 within a particular measurement interval. This metric may be available as a cumulative OM 120 (where it indicates the total number of successfully received and processed PUCCH packets at the baseband controller 104, from all RPs 106, within the particular measurement interval); and/or RP-specific OM(s) 122 (each indicating the number of successfully received and processed PUCCH packets at the baseband controller 104, from an individual RP 106, within the particular measurement interval). Also, this metric may reset to 0 at start of each measurement interval (i.e., it is not cumulative across measurement intervals).

A Physical Uplink Control Channel (PUCCH) packet loss count metric (FHPUCCHPktLossCount), stored in the baseband controller 104, indicates a number of PUCCH packets that were lost during transit from RP(s) 106 to the baseband controller 104 within a particular measurement interval. Here, "lost" packets include packets that are (1) lost in transit; (2) delayed beyond the expected SFN/SF (and therefore, not processed); (3) or discarded in response to a parametric check failure. Each RP 106 keeps track of the total number of PUCCH packets transmitted to the baseband controller 104 in the given measurement interval and sends this information to the baseband controller 104. The baseband controller 104 determines the total number of PUCCH packets lost based on the number of transmitted packets (from the RP 106) and the number of successfully received packets in the measurement interval. This metric may be available as a cumulative OM 120 (where it indicates the total number of PUCCH packets lost, in transit from all RPs 106 to the baseband controller 104, within the particular measurement interval); and/or RP-specific OM(s) 122 (each indicating the number of PUCCH packets lost, in transmission from an individual RP 106 to the baseband controller 104, within the particular measurement interval). Also, this metric may reset to 0 at start of each measurement interval (i.e., it is not cumulative across measurement intervals).

A Random Access Channel (RACH) packet loss count metric (FHRACHPktLossCount), stored in the baseband controller 104, indicates a number of RACH packets that were lost during transit from RP(s) 106 to the baseband controller 104 within a particular measurement interval. Each RP 106 keeps track of the total number of RACH packets transmitted to the baseband controller 104 in the given measurement interval and sends this information to the baseband controller 104. The baseband controller 104 determines the total number of RACH packets lost based on the number of transmitted packets (from the RP 106) and the number of successfully received packets in the measurement interval. This metric may be available as a cumulative OM 120 (where it indicates the total number of RACH packets lost, in transit from all RPs 106 to the baseband controller 104, within the particular measurement interval); and/or RP-specific OM(s) 122 (each indicating the number of RACH packets lost, in transit from an individual RP 106 to the baseband controller 104, within the particular measurement interval). Also, this metric may reset to 0 at start of each measurement interval (i.e., it is not cumulative across measurement intervals).

A Physical Downlink Shared Channel (PDSCH) packet loss count metric (FHPDSCHPktLossCount), stored in the baseband controller 104, indicates a number of PDSCH packets that were lost during transit from the baseband controller 104 to the RP(s) 106 in a particular measurement interval. The baseband controller 104 may track of the total number of PDSCH packets transmitted to the RP(s) 106 in the particular measurement interval. The baseband controller 104 determines the total number of PDSCH packets lost based on the number of transmitted packets (from the baseband controller 104) and the number of packets successfully received and processed by the RP(s) 106 in the measurement interval. This metric may be available as a cumulative OM 120 (where it indicates the total number of PDSCH packets lost in transit from the baseband controller 104 to all RPs 106, within the particular measurement interval); and/or RP-specific OM(s) 122 (each indicating the number of PUSCH packets lost in transit from the baseband controller 104 to an individual RPs 106, within the particular measurement interval). Also, this metric may reset to 0 at start of each measurement interval (i.e., it is not cumulative across measurement intervals).

A Sounding Reference Signal (SRS) packet loss count metric (FHSRSPktLossCount), stored in the baseband controller 104, indicates a number of SRS packets that were lost during transit from RP(s) 106 to the baseband controller 104 in a particular measurement interval. Each RP 106 keeps track of the total number of SRS packets transmitted to the baseband controller 104 in the given measurement interval and sends this information to the baseband controller 104. The baseband controller 104 determines the total number of SRS packets lost based on the number of transmitted packets (from the RP 106) and the number of successfully received packets in the measurement interval. This metric may be available as a cumulative OM 120 (where it indicates the total number of SRS packets lost, in transit from all RPs 106 to the baseband controller 104, within the particular measurement interval); and/or RP-specific OM(s) 122 (each indicating the number of SRS packets lost, in transit from an individual RP 106 to the baseband controller 104, within the particular measurement interval). Also, this metric may reset to 0 at start of each measurement interval (i.e., it is not cumulative across measurement intervals).

A Physical Downlink Control Channel (PDCCH) packet loss count metric (FHDLCCHPktLossCount), stored in the baseband controller 104, indicates a number of DLCCH packets that were lost during transit from the baseband controller 104 to the RP(s) 106 in a particular measurement interval. The baseband controller 104 may track the total number of PDCCH packets transmitted to the RP(s) 106 in the given measurement interval. The baseband controller 104 determines the total number of PDCCH packets lost based on the number of transmitted packets (from the baseband controller 104) and the number of packets successfully received and processed by the RP(s) 106 in the measurement interval. This metric may be available as a cumulative OM 120 (where it indicates the total number of PDCCH packets lost in transit from the baseband controller 104 to all RPs 106, within the particular measurement interval); and/or RP-specific OM(s) 122 (each indicating the number of PDCCH packets lost in transit from the baseband controller 104 to an individual RPs 106, within the particular measurement interval). Also, this metric may reset to 0 at start of each measurement interval (i.e., it is not cumulative across measurement intervals).

It is understood that that a complete DLCCH loss in a particular measurement interval shall also be accounted in this metric (unlike FHPDSCHPktLossCount) since the RPs 106 are expected to receive at least two DLCCH packets per symbol per TTI (the exact number of DLCCH packets per symbol per TTI depends on the Control Format Indicator (CFI)). In these cases, this PDCCH packet loss count metric may be incremented by two per TTI.

It is assumed herein that the DLCCH packet that indicates the total number of expected PDSCH packets is received successfully at the RP(s) 106. If this DLCCH packet is also lost, then there is no way for the RP to know about the loss of a PDCCH packet.

Example Table of Fronthaul OMs

The fronthaul OMs 118 described herein may be stored in any suitable data structure. Table 1 illustrates an example data structure that stores RP-specific OMs 122 for four individual RPs 106 (having serial number (SN) A, B, C, and D) in memory on (or coupled to) the baseband controller 104 and/or RPs 106.

Each row of Table 1 includes RP-specific OMs 122 for a particular measurement interval (MI=N). The first column of Table 1 indicates the measurement interval (MI) to which the RP-specific OMs 122 in the same row correspond. The second column of Table 1 indicates the serial number (SN) of the RP 106 to which the RP-specific OMs 122 on the same row correspond. Accordingly, Table 1 includes four sets of RP-specific OMs 122 for each of RP A, RP B, RP C, and RP D. The third through fourteenth columns of Table 1 include RP-specific OMs 122 for respective uplink or downlink channels.

TABLE 1

| MI | SN | FHRACHPktSuccCount | FHRACHPktLossCount | FHSRSPktSuccCount | FHSRSPktLossCount | FHPUSCHPktSuccCount |
|---|---|---|---|---|---|---|
| N | A | 1 | 0 | 2810 | 0 | 24802958 |
| N | B | 0 | 0 | 2810 | 0 | 0 |
| N | C | 0 | 0 | 2810 | 0 | 0 |
| N | D | 0 | 0 | 2810 | 0 | 0 |

TABLE 1

| FHPUSCHPktLossCount | FHPUCCHPktSuccCount | FHPUCCHPktLossCount | FHDLCCHPktSuccCount |
|---|---|---|---|
| 422 | 9853 | 8 | 1200344 |
| 0 | 0 | 0 | 1200343 |
| 0 | 0 | 0 | 1200343 |
| 0 | 0 | 0 | 1200343 |

TABLE 1-continued

| FHDLCCHPktLossCount | FHPDSCHPktSuccCount | FHPDSCHPktLossCount |
|---|---|---|
| 115 | 7646949 | 0 |
| 116 | 326490 | 0 |
| 115 | 347471 | 0 |
| 116 | 247066 | 0 |

As shown in Table 1, RP A did not experience any packet losses, during measurement interval N, on the RACH, SRS, or PDSCH, but experienced losses of 422, 8, and 115 packets on the PUSCH, PUCCH, and DLCCH (PDCCH), respectively, during measurement interval N. It can, therefore, be deduced from Table 1 that RP A sent 9861 PUCCH packets during measurement interval N because 8 PUCCH packets from RP A were lost and 9853 PUCCH packets from RP A were successfully received and processed during measurement interval N. Similarly, it can be deduced from Table 1 that the baseband controller 104 sent 7646949 PDSCH packets to RP A during measurement interval N because 0 PDSCH packets were lost and 7646949 PDSCH packets were received and processed by RP A during measurement interval N.

Similarly, RP C did not experience any packet losses, during measurement interval N, on the RACH, SRS, PUSCH, PUCCH, or PDSCH, but experienced losses of 115 packets on the DLCCH (PDCCH) during measurement interval N. Similarly, RP B did not experience any packet losses, during measurement interval N, on the RACH, SRS, PUSCH, PUCCH, or PDSCH, but experienced losses of 116 packets on the DLCCH (PDCCH) during measurement interval N. Similarly, RP D did not experience any packet losses, during measurement interval N, on the RACH, SRS, PUSCH, PUCCH, or PDSCH, but experienced a loss of 116 packets on the DLCCH (PDCCH) during measurement interval N.

Table 2 illustrates an example data structure that stores cumulative OMs 120 for the baseband controller 104 (having serial number (BC SN) M) serving the four individual RPs 106 (from Table 1) during a measurement interval spanning multiple aggregation intervals. Table 2 may be stored in memory on (or coupled to) the baseband controller 104. Each row of Table 2 includes cumulative OMs 120 for a particular measurement interval N, e.g., spanning RPs A-D in Table 1. In some configurations, the measurement interval may be 15 minutes long. Table 2 includes cumulative OMs 120 corresponding to the same channels for which RP-specific OMs 122 are shown in Table 1, although more, less, and/or different or derived channels may be used.

TABLE 2

| BC SN | AggregFHRACHPktSuccCount | AggregFHRACHPktLossCount | AggregFHSRSPktSuccCount | AggregFHSRSPktLossCount | AggregFHPUSCHPktSuccCount |
|---|---|---|---|---|---|
| M | 1 | 0 | 11240 | 0 | 24802958 |

TABLE 2

| AggregFHPUSCHPktLossCount | AggregFHPUCCHPktSuccCount | AggregFHPUCCHPktLossCount | AggregFHDLCCHPktSuccCount |
|---|---|---|---|
| 422 | 9853 | 8 | 4801373 |

| AggregFHDLCCHPktLossCount | AggregFHPDSCHPktSuccCount | AggregFHPDSCHPktLossCount |
|---|---|---|
| 462 | 8567976 | 0 |

The first column of Table 2 indicates the baseband controller serial number (BC SN) to which the cumulative OMs 120 in the same row correspond. The second through thirteenth columns of Table 2 include cumulative OMs 120 for respective uplink or downlink channels.

As an example from Table 2, 11240 SRS packets were successfully received and processed by the baseband controller 104 from RP A-D during the measurement interval N across RPs A-D. This number (11240) can be derived as the sum of all entries in the FHSRSPktSuccCount column of Table 1 (4*2810=11240). Similarly, 0 SRS packets were lost in transit from RP A-D during the measurement interval N. Similar derivations of each cumulative OM 120 in Table 2 can be made from the RP-specific OMs 122 in corresponding columns of Table 1.

Example Use of Fronthaul OMs to Diagnose KPI Problems in C-RAN

The fronthaul OMs 118 may be used to diagnose KPI problems in a C-RAN 100. In some configurations, cumulative OM(s) 120 may be used first, e.g., to identify whether the problem is on the uplink or downlink and/or which channel(s) is/are affected. RP-specific OM(s) 122 may then be used, e.g., to determine specific switch(es) and/or link bandwidth in the fronthaul network 116 (and/or RPs 106) are having problems. The following scenarios are merely exemplary and it is understood that the fronthaul OMs 118 may be used in many different scenarios.

In a first example, an operator may deploy a C-RAN 100 with RPs 106 spread across different floors of two different (e.g., nearby) buildings. If KPI degradation(s) is/are detected in one of the buildings, cumulative OM(s) 120 may be checked to determine a particular channel (uplink or downlink) experiencing high packet loss. After a particular channel is identified from the cumulative packet loss OM(s) 120, the RP-specific packet loss OMs 122 (for RPs 106 in the building that is experiencing KPI degradation(s)) may be used to identify a common switch and/or link among them. Once identified, the switch and/or link may be reconfigured, reset, replaced, and/or debugged in order to correct the KPI degradations. The cumulative OM(s) 120 and/or the RP-specific OMs 122 may be viewed, by a technician, at the baseband controller 104 or remotely.

In a second example, an operator may deploy a C-RAN 100 with RPs 106 spread across different floors of a single building, e.g., with poor uplink throughput detected (e.g., from fronthaul OMs 118) on a first floor (e.g., 2 Mbps), while other floors of the same building had normal uplink throughput (e.g., around 40 Mbps). Then, if the first floor had multiple RPs 106 providing uplink data to the baseband controller 104, the fronthaul bandwidth may be identified as a problem, e.g., if the fronthaul bandwidth is not large enough to support 3*600 Mbps (per RP 106)=1.8 Gbps (where 600 Mbps is the PUSCH fronthaul data rate assumed for 20 MHz). If this is the case, most of the IQ packets wouldn't reach the baseband controller 104, so the throughput for the particular uplink channel would suffer. Once the fronthaul link bandwidth is reconfigured to accommodate 1.8 Gbps, the uplink throughput may normalize to 40 Mbps.

Compatibility with Different Functional Splits

Figure 2:
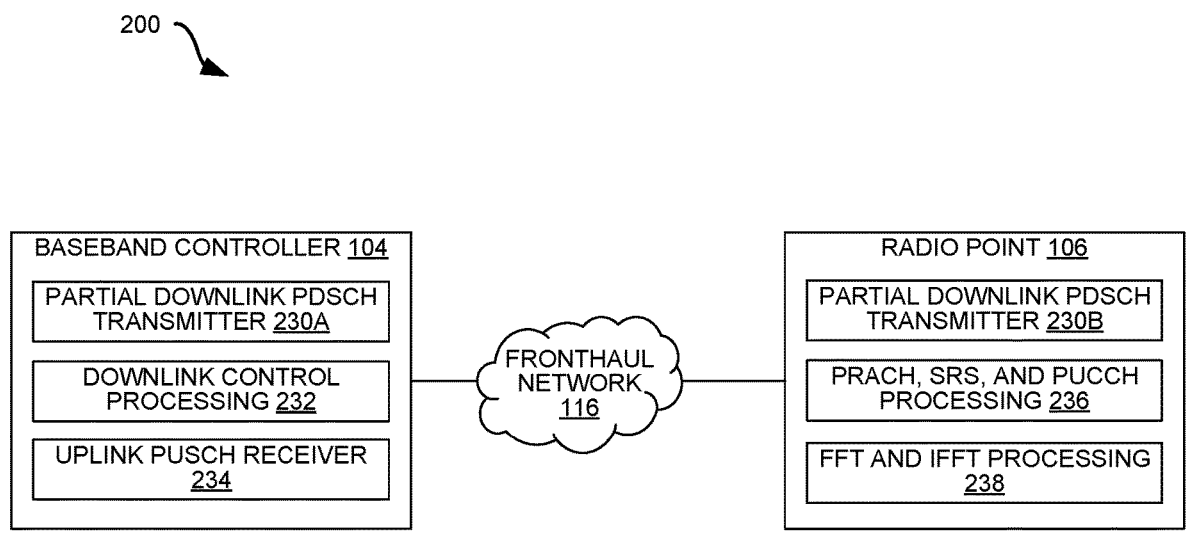
FIG. 2 is a block diagram illustrating example channel processing performed in an example C-RAN.

FIG. 2 is a block diagram illustrating example channel processing performed in an example C-RAN 200. As before, the baseband controller 104 is coupled to at least one radio point 106 via a fronthaul network 116, each of which functions generally as described above. Although not shown in FIG. 2, the example C-RAN 200 would generally include multiple radio points 106 at a site 102, and the baseband controller 104 would be coupled to the core network 112 of each wireless network operator over an appropriate backhaul network 114.

In a C-RAN 200, some channel coding/decoding is implemented in the RP(s) 106 and some channel coding/decoding is implemented in the baseband controller 104. FIG. 2 illustrates an example of where the processing may be performed for various uplink channels (SRS, PRACH, PUCCH, PUSCH) and downlink channels (PDCCH, PDSCH). However, it is understood that the fronthaul OMs 118 described herein may be compatible with other configurations. Additionally, fronthaul OMs may be tracked for more, less, and/or different or derived channels than those specifically mentioned herein.

In the example C-RAN 200 of FIG. 2, a portion of the PDSCH processing may be performed (using a partial downlink PDSCH transmitter 230A-B) in each of the baseband controller 104 and the RP 106. The PDCCH and PUSCH processing may be performed in the baseband controller 104 using a downlink control processing 232 module and an uplink PUSCH receiver 234, respectively. The SRS, PRACH, and PUCCH L1 processing 236 may be performed in the RPs 106. Additionally, the Fast Fourier Transform (FFT) and Inverse FFT (IFFT) processing 238 may be performed in the RP 106 as part of the analog RF functions for the air interface.

Figure 3:
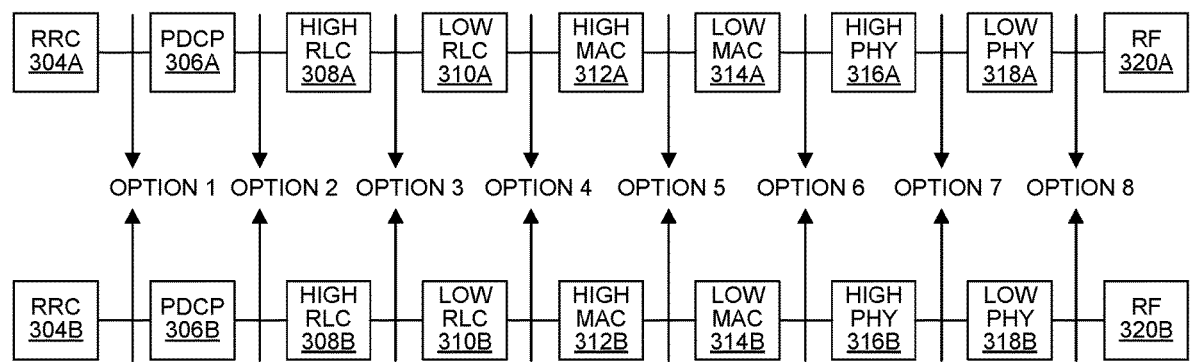
FIG. 3 is a block diagram illustrating example functional splits between the baseband controller and RPs.

FIG. 3 is a block diagram illustrating example functional splits between the baseband controller 104 and RPs 106. In 5G, the functional split may instead refer to the allocation of functions between (1) the RPs 106 and (2) the Distributed Unit (DU) and/or Central Unit (CU), referred to as "DU/CU". As discussed above, some combination of the baseband controller 104 and RPs 106 perform analog radio frequency (RF) functions for the air interface as well as digital Layer 1 (L1), Layer 2 (L2), and Layer 3 (L3) (of the 3GPP-defined LTE radio access interface protocol) functions for the air interface.

Various options of functional splits are illustrated in FIG. 3, where the functions on the left side of the vertical arrows for a given option are implemented at the baseband controller 104 in LTE (or DU/CU in 5G) and the functions on the right side of the vertical arrows are implemented at the radio points (RPs) 106 in LTE (or next generation RPs). The top half of FIG. 3 illustrates the split between a first RP 106 and a baseband controller 104 (or DU/CU), and the bottom half of FIG. 3 illustrates the split between a second RP 106 and the baseband controller 104 (or DU/CU).

In option 1, the Radio Resource Control (RRC) 304A-B portions of L3 processing are performed at the baseband controller 104 (or DU/CU) while the Packet Data Convergence Protocol (PDCP) 306A-B portions of the L3 processing (along with all analog RF 320A-B, L1, and L2 processing) are performed at the RPs 106. In option 2, the RRC 304 and PDCP 306 portions of L3 are performed at the baseband controller 104 (or DU/CU), while all analog RF, L1, and L2 functions are performed at the RPs 106. In option 3, the L3 (RRC 304 and PDCP 306 portions) and high Radio Link Control (RLC) portions 308A of the L2 processing are performed at the baseband controller 104 (or DU/CU), while the remaining L2 processing (low RLC 310A-B, high MAC 312A-B, low MAC 314A-B), along with L1 and analog RF 320 processing, are performed at the RPs 106. In option 4, the L3 (RRC 304 and PDCP 306 portions), high RLC 308 portions, and low RLC 310 portions of the L2 processing are performed at the baseband controller 104 (or DU/CU), while the remaining high MAC 312 portions and low MAC 314A-B portions of the L2 processing, along with L1 and analog RF 320 processing, are performed at the RPs 106.

In option 5, the L3 (RRC 304 and PDCP 306 portions), high RLC 308 portions, low RLC 310 portions, and high MAC 312 portions of the L2 processing are performed at the baseband controller 104 (or DU/CU), while the remaining low MAC 314A-B portions of the L2 processing, along with L1 and analog RF 320 processing, are performed at the RPs 106. In option 6, all L3 (RRC 304 and PDCP 306 portions) and L2 processing (high RLC 308 portions, low RLC 310 portions, high MAC 312 portions, and low MAC 314 portions) is performed at the baseband controller 104 (or DU/CU), while the L1 processing (high physical layer (PHY) 316A-B and low PHY 318A-B portions) and analog RF 320 processing, are performed at the RPs 106. In some configurations, the option 6 split may create very low data rate and high latency margin between RP(s) 106 and the baseband controller 104.

In option 7, all L3 processing, L2 processing and high PHY 316 portions of the L1 processing are performed at the baseband controller 104 (or DU/CU), while the low PHY 318A-B portions of the L1 processing (and analog RF 320 processing) are performed at the RPs 106. In option 8, all L3, L2, and L1 (high PHY 316 and low PHY 318 portions) are performed at the baseband controller 104 (or DU/CU), while the analog RF 320 processing is performed at the RPs 106.

The terms "high" and "low" with respect to RLC, MAC, and PHY refer to high latency and low latency, respectively. Conversely, they also mean "low data rate" and "high data rate" in fronthaul network 116, respectively, for the corresponding protocol layer traffic. For example, with a high MAC split, the fronthaul will become a low data rate and high latency link such that the fronthaul link can be comprised of copper cables instead of high-speed fiber link.

The fronthaul OMs 118 described herein are applicable to (and compatible with) all functional splits between baseband controller 104 and RPs 106, including those in 3GPP 5G architectures. In other words, the fronthaul OMs 118 described herein may be used no matter which FIG. 3 option is used to allocate functionality/processing between the baseband controller 104 and RP(s) 106.

Advantages and Other Compatibility Issues

In some scenarios, the switch(es) in the fronthaul network 116 are shared by a neutral host that implements other services, e.g., 3G, Wi-Fi, etc. In such a case, the traffic shaping policy of co-hosted services may affect C-RAN traffic, which could cause KPI degradations. Without the fronthaul OMs 118, it would be difficult to figure out if the problem is the configuration(s) of the switch(es), traffic shaping changes, or a problem with LTE or 5G implementation itself by the C-RAN 100. In other words, the fronthaul OMs 118 may indicate whether policy/traffic shaping on co-hosted vendors (in neutral-host-sharing scenarios) is affecting C-RAN 100 traffic. In other words, without the fronthaul OMs 118, any KPI degradations (e.g., low throughput) in a distributed RAN will take a long time to isolate to switch-related configuration issues.

Additionally, since the fronthaul OMs 118 are maintained at the application level (at the baseband controller 104 and RPs 106), they are compatible with different configurations of the fronthaul network 116. For example, the fronthaul OMs 118 may be used with switches from different vendors, different cable types used in the fronthaul network 116, different link-aggregation schemes used in fronthaul 116, etc.

Additionally, a C-RAN 100 should be able to operate under a variety of traffic scenarios and loading. It is difficult to anticipate what the peak traffic will be in a C-RAN 100 deployment (or the problems caused by certain peak traffic scenarios). However, the packet loss OMs 118 will capture number (or percentage) of losses in fronthaul packets of different channels due to packets being delayed (before being sent and/or received), thus enabling quicker solutions when problems arise, as well as reduce CAPEX investments in deployments that have over-provisioned fronthaul networks 116. For example, 10 Gbps fiber optic fronthaul bandwidth may be overkill if the peak packet rate does not even use 50% of the line-rate of 10 Gbps.

Additionally, the fronthaul OMs 118 may be utilized in distributed RAN systems in order to meet the Service Level Agreements (SLAs) with operators in LTE and/or 5G systems.

Other Enhancements

Normally, the RP 106 is a slave and the L2 scheduler in the baseband controller 104 is a master that sends commands to the RP 106 to decode the uplink channel(s) or transmit the DL channels every TTI. The baseband controller 104 also sends configuration information to RPs 106. If these commands (instructing the RPs 106 to send the PRBs and/or data) are delayed/dropped/discarded by the RP 106, then the baseband controller 104 will not be aware and would still schedule the transport blocks in the downlink and attempt to decode received data in uplink, of which there is actually none.

For example, the baseband controller 104 may send a command scheduling the RP 106 to send PUSCH data in a certain TTI. But if that command doesn't go through, the RP 106 won't send any data. However, if a fronthaul OM 118 is implemented for the command itself, the RP 106 would inform baseband controller 104 that it hasn't received any commands. The baseband controller 104 could also determine that it didn't send any commands in the first place so there wasn't any packet loss. In contrast, if the baseband controller 104 sends such a scheduling command and the command is dropped or delayed and not processed, this could indicate some problem in the baseband-controller-to-RP path that needs to be addressed. A separate fronthaul OM 118 may be implemented for scheduling commands from the baseband controller 104 to the RP 106 relating to each uplink channel for which an auditable record is desired.

Methods

Figure 4:
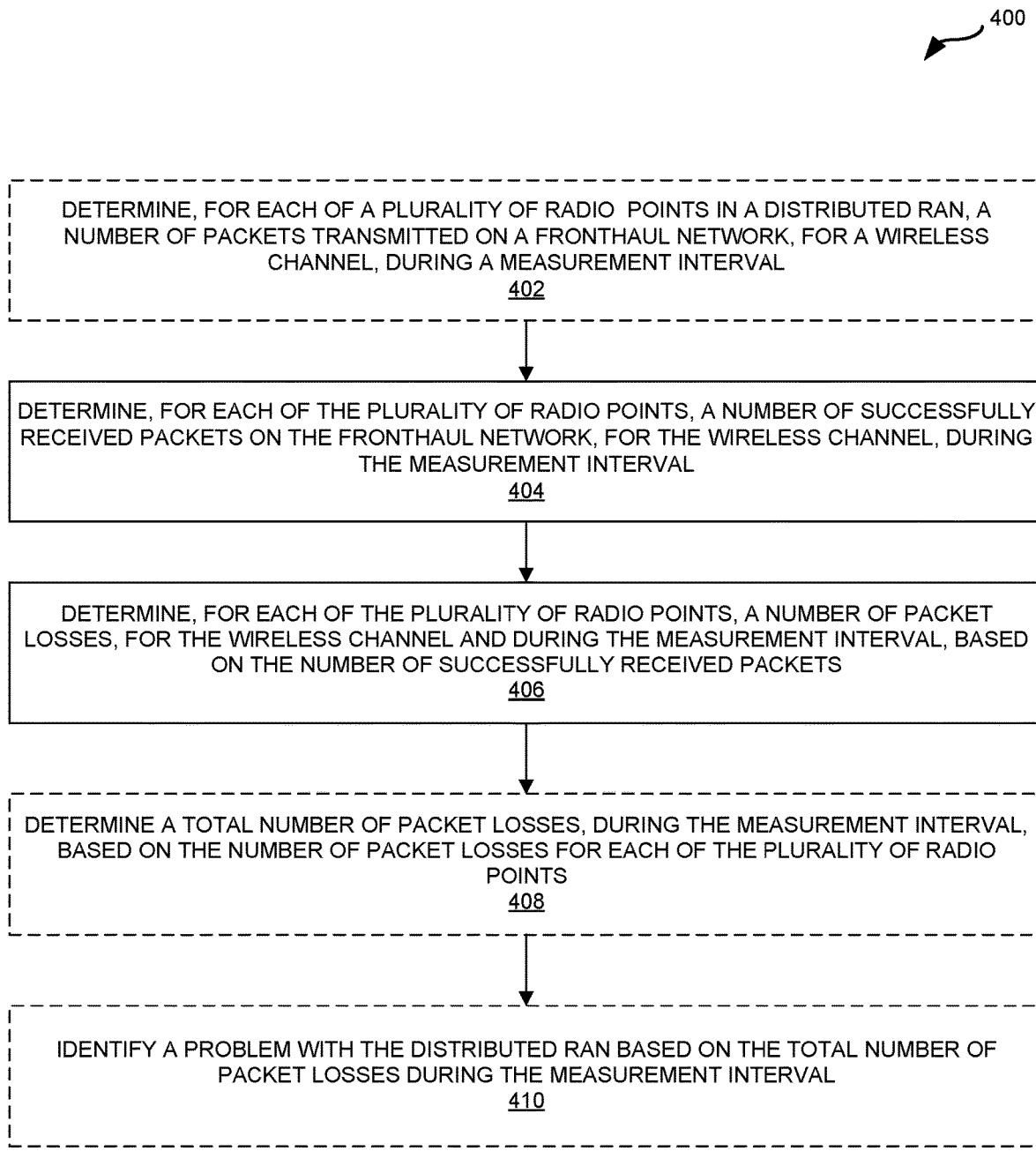
FIG. 4 is a flow chart illustrating one exemplary method for implementing fronthaul operational measurements (OMs) in a C-RAN.

FIG. 4 is a flow chart illustrating one exemplary method 400 for implementing fronthaul operational measurements (OMs) 118 in a distributed RAN (e.g., C-RAN 100). The method 400 shown in FIG. 4 may be performed by a baseband controller 104 and/or RP(s) 106 in the distributed RAN (e.g., C-RAN 100). At least some of the metrics discussed herein may be stored in a data structure (e.g., a table described above) in at least one memory on (and/or coupled to) the baseband controller 104. The method 400 is described for a single wireless channel (uplink or downlink), however, the method 400 could be performed for more than one wireless channel (uplink and/or downlink). Additionally, the RP-specific OMs 122 may be determined iteratively every new measurement interval.

The blocks of the flow diagram shown in FIG. 4 have been arranged in a generally sequential manner for ease of explanation; however, it is to be understood that this arrangement is merely exemplary, and it should be recognized that the processing associated with method 400 (and the blocks shown in FIG. 4) can occur in a different order (for example, where at least some of the processing associated with the blocks is performed in parallel and/or in an event-driven manner). Also, most standard exception handling is not described for ease of explanation; however, it is to be understood that method 400 can and typically would include such exception handling.

The method 400 begins at optional step 402 where the baseband controller 104 determines, for each of a plurality of RPs 106 in the distributed RAN, the number of packets transmitted on a fronthaul network 116, for a wireless channel, during a measurement interval. This count (determined for each of the RPs 106) may or may not be considered to be a fronthaul OM 118.

In the uplink, each RP 106 may (1) maintain a count of the number of uplink packets transmitted to the baseband controller 104 on a particular uplink channel during a particular aggregation interval; and (2) send this count to the baseband controller 104, e.g., every aggregation interval using heartbeat messages. The counts from a particular RP 106 and uplink channel may be accumulated across all the aggregation intervals in a measurement interval. In uplink, the baseband controller 104 may determine the number of transmitted packets for each RP 106 (by step 402). In examples, and without limitation, the uplink channel(s) tracked may include SRS, RACH, PUCCH, and/or PUSCH.

In the downlink, the baseband controller 104 may maintain (and store) a count of the number of downlink packets transmitted to individual RPs 106 on a particular downlink channel during a particular measurement interval. In examples, and without limitation, the downlink channel(s) tracked may include PDSCH and/or PDCCH.

The method 400 proceeds at step 404 where the baseband controller 104 determines, for each of the plurality of RPs 106, a number of successfully received packets on the fronthaul network, for the wireless channel, during the measurement interval. Each of these counts (of packets that were successfully received) is an RP-specific OM 122.

In the uplink, the baseband controller 104 may receive a count, for the previous aggregation interval, in a current aggregation interval from each RP 106. These counts may be accumulated into RP-specific OMs 122, which are determined and stored, at the baseband controller 104, for each RP 106 and measurement interval. This RP-specific OM 122 (associated with an uplink channel) is not incremented for packets that are not received by the baseband controller 104 in the expected subframe and system frame number (and therefore, not processed by the RP 106). In other words, a particular uplink packet is a successfully received packet only if it is received via the fronthaul network 116 at an expected subframe (SF) and system frame number (SFN) and, thereafter, processed by the baseband controller 104.

In the downlink, each RP 106 may (1) maintain a count of the number of downlink packets it received (and processed) on a particular channel during each aggregation interval; and (2) send each count to the baseband controller 104 during the subsequent aggregation interval. The counts may be accumulated, across a measurement interval, into an RP-specific OM 122 for the RP 106 and measurement interval. This RP-specific OM 122 (associated with a downlink channel) is not incremented for packets that are not received by the RP 106 in the expected subframe and system frame number (and therefore, not processed by the RP 106). In other words, a particular downlink packet is a successfully received packet only if it is received via the fronthaul network 116 at an expected subframe (SF) and system frame number (SFN) and, thereafter, processed by the RP 106.

The method 400 proceeds at step 406 where the baseband controller 104 determines, for each of the plurality of RPs 106, a number of packet losses, for the wireless channel and during the measurement interval, based on the number of successfully received packets (from step 404). For example, this number of packet losses (during the measurement interval) may be determined by subtracting the number of successfully received packets (in step 404) from the number of packets transmitted on the fronthaul network, for the wireless channel, during the measurement interval (e.g., in step 402). This number (of packet losses) is an RP-specific OM 122 that is maintained for each RP 106 connected to the distributed RAN (e.g., C-RAN 100).

The method 400 proceeds at optional step 408 where the baseband controller 104 determines a total number of packet losses, during the measurement interval, based on the number of packet losses (from step 406) for each of the plurality of RPs 106. For example, the total number of packet losses may be determined by summing the RP-specific number of packet losses for the wireless channel across multiple RPs 106 during the measurement interval. In other words, each cumulative OM 120 indicating packet losses for a channel in Table 2 may be the sum of the RP-specific OMs 122 indicating packet losses for the channel in a corresponding column of Table 1. The measurement interval may be 15 minutes in some configurations. This total number of packet losses may be a cumulative OM 120.

In some configurations, a cumulative OM 120 indicating the total number of packets that were successfully received, during the measurement interval for a particular channel, may also be determined. For example, the total number of successfully received packets may be determined by summing the RP-specific number of successfully received packets for the wireless channel across multiple RPs 106. In other words, each cumulative OM 120 indicating successfully received packets for a channel in Table 2 may be the sum of the RP-specific OMs 122 indicating successfully received packets for the channel in a corresponding column of Table 1.

The method 400 proceeds at optional step 410 where a problem with the distributed RAN (e.g., C-RAN 100) is identified based on the total number of packet losses during the measurement interval (from step 408). Additionally or alternatively, a problem with the distributed RAN (e.g., C-RAN 100) may be identified based on the RP-specific packet losses during the measurement interval (from step 406). Additionally, or alternatively, a problem with the distributed RAN (e.g., C-RAN 100) may be identified based on at least one RP-specific OM 122 (from step 404), or cumulative OM 120, indicating the number of successfully received packets for a particular channel.

A technician may determine the problem based on the cumulative OM(s) 120 and/or the RP-specific OM(s) 122 output by the baseband controller, e.g., via physical printout, electronic display, electronic transmission to another device, etc. In one example, the total number of packet losses may be used to identify poor throughput on the uplink and/or downlink, after which the RP-specific packet losses are used to determine a common switch (through which the problematic RPs 106 communicate with the baseband controller 104) that is causing problems.

Example 5G System Implementing Fronthaul OMs

Figure 5:
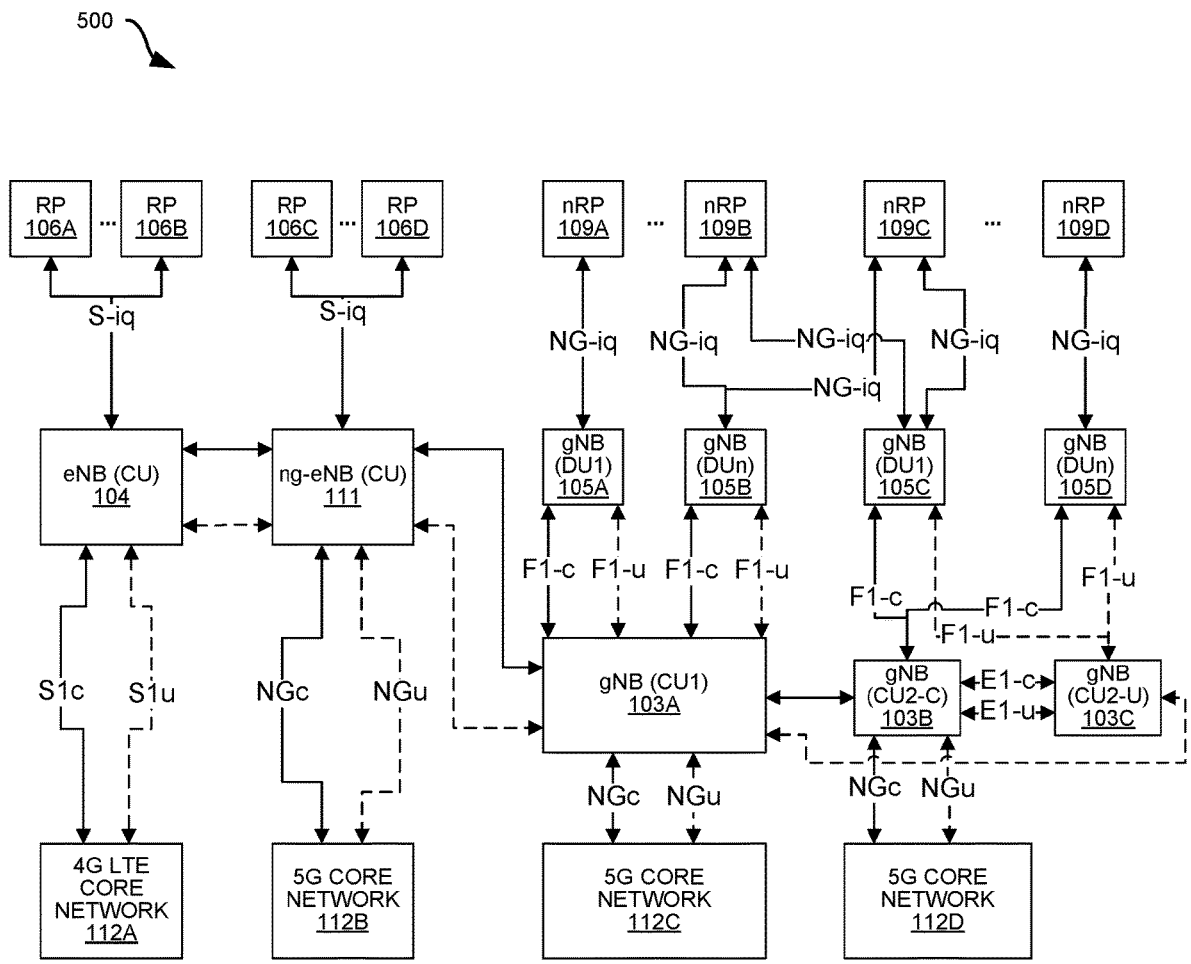
FIG. 5 is a block diagram illustrating an exemplary configuration of a system that includes 3GPP Fourth Generation (4G) and Fifth Generation (5G) components.

FIG. 5 is a block diagram illustrating an exemplary configuration of a system 500 that includes 3GPP Fourth Generation (4G) and Fifth Generation (5G) components. Alternatively, the system 500 may include only 4G or only 5G components. Each of the components may be implemented using at least one processor executing instructions stored in at least one memory. In some configurations, at least some of the components are implemented using a virtual machine. The system 500 may implement fronthaul OMs 118, as described below.

Fifth Generation (5G) standards support a wide variety of applications, bandwidth, and latencies while supporting various implementation options. In the system 500, interfaces denoted with "–C" (illustrated with solid lines) provide control plane connectivity, while interfaces denoted with ("–U") (illustrated with dashed lines) provide user plane connectivity. More explanation of the various devices and interfaces in FIG. 5 can be found in 3GPP TR 38.801 Radio Access Architecture and Interfaces, Release 14 (available at https://portal.3 gpp.org/desktopmodules/Specifications/SpecificationDetails.aspx? specificationId=3056), which is incorporated by reference herein. FIG. 5 illustrates three different types of access networks: an eNodeB (eNB) on the left, an LTE Next Generation eNodeB (ng-eNB), and two different examples of a 5G Next Generation NodeB (gNB controller) on the right.

The LTE eNB may include a Central Unit (CU) (e.g., that is implemented in a baseband controller 104) and a set of RPs 106A-B. An LTE S1 interface (including the S1c part (control plane) and S1u part (user plane)) is used between CU 104 and at least one wireless service provider's LTE core network 112A. As described above, the RPs 106A-B may communicate IQ data to the CU 104 using the LTE S-iq interface.

RP-specific OMs 122 may be implemented (in the CU 104 and/or RPs 106A-B) to track the following metrics relating to uplink and/or downlink channels between the CU 104 and each individual RP 106A-B (during a measurement interval): (1) the number of packet losses; and (2) the number of packets successfully received (and processed) at the RP 106 or CU 104, depending on whether the channel is an uplink or downlink channel. Similarly, cumulative OMs 120 may be implemented (in the CU 104) to track the following metrics relating to uplink and/or downlink channels between the CU 104 and all RPs 106A-B (during a measurement interval): (1) the number of packet losses; and (2) the number of packets successfully received (and processed) at the RP 106 or CU 104, depending on whether the channel is an uplink or downlink channel.

In the example in FIG. 5, the ng-eNB may include a Central Unit (CU) 111 and a set of RPs 106C-D. The CU 111 communicate with at least one wireless service provider's Next Generation Cores (NGC) 112B using the 5G NGc and 5G NGu interfaces. The RPs 106C-D in the ng-eNB may also communicate IQ data to the CU 111, e.g., using the LTE S-iq interface. The ng-eNB may provide LTE and/or 5G service to UEs 110.

RP-specific OMs 122 may be implemented (in the CU 111 and/or RPs 106C-D) to track the following metrics relating to uplink and/or downlink channels between the CU 111 and each individual RP 106C-D (during a measurement interval): (1) the number of packet losses; and (2) the number of packets successfully received (and processed) at the RP 106 or CU 111, depending on whether the channel is an uplink or downlink channel. Similarly, cumulative OMs 120 may be implemented (in the CU 111) to track the following metrics relating to uplink and/or downlink channels between the CU 111 and all RPs 106C-D (during a measurement interval): (1) the number of packet losses; and (2) the number of packets successfully received (and processed) at the RP 106 or CU 111, depending on whether the channel is an uplink or downlink channel.

The architecture of a Next Generation NodeB (gNB controller) is partitioned into a 5G Central Unit (CU) 103A-C and a 5G Distributed Unit (DU) 105A-D. A 5G Central Unit (CU) 103 is a node that includes the gNB controller functions such as the transfer of user data, mobility control, radio access network sharing, positioning, session management, etc. The 5G CU 103 controls the operation of the Distributed Units (DUs) 105A-D over a fronthaul interface (including F1-c and F1-u for the control plane and user plane, respectively). The 5G CU 103 may communicate with at least one wireless service provider's Next Generation Cores (NGC) 112C-D using 5G NGc and 5G NGu interfaces.

The Distributed Units (DUs) 105 may be nodes that implement a subset of the gNB controller functions, depending on the functional split (between CU 103 and DU 105). In some configurations, the L3 functionality may be implemented in the CU 103 and the L2 operations may be implemented in the DU 105. The operation of each DU 105 is controlled by a CU 103. The functions of the DU 105 may include Radio Link Control (RLC), portions of Medium Access Control (MAC) and/or portions of the physical (PHY) layer functions. A Distributed Unit (DU) can further offload some of its PHY functions to RPs 106.

RP-specific OMs 122 may be implemented (in the CU 103, DUs 105, and/or nRPs 109) to track the following metrics relating to uplink and/or downlink channels between the DUs 105 and each individual nRP 109 (during a measurement interval): (1) the number of packet losses; and (2) the number of packets successfully received (and processed) at the nRP 109 or DU 105, depending on whether the channel is an uplink or downlink channel. Similarly, cumulative OMs 120 may be implemented (in the CU 103 or DU 105) to track the following metrics relating to uplink and/or downlink channels between the DUs 105 and all nRPs 109 (during a measurement interval): (1) the number of packet losses; and (2) the number of packets successfully received (and processed) at the nRP 109 or DU 105, depending on whether the channel is an uplink or downlink channel. Additionally, instead of (or in addition to) tracking packets between the nRPs 109 and DUs 105, the fronthaul OMs 118 may track packets between the DU(s) 105 and CU(s) 103.

In some configurations, a 5G CU is split between a CU-C 103B that handles control plane functions and a CU-U 103C that handles user plane functions. In a split configuration, the CU-C 103B may communicate with the CU-U 103C using 5G E1-c and 5G E1-u interfaces, respectively.

In one configuration, the Next generation RPs (nRPs) 109A-D may communicate baseband signal data to the DUs 105 on an NG-iq interface. In some configurations, the nRPs 109 may implement at least some of the Layer-1 and/or Layer-2 functions. In some configurations, the nRPs 109 may have multiple ETHERNET ports and can communicate with multiple switches.

Any of the interfaces in FIG. 5 may be implemented using a switched ETHERNET (or fiber) network. Additionally, the various CUs in FIG. 5 may communicate with each other using any suitable interface, e.g., an Xn (Xn-c and Xn-u) and/or X2 interface. A fronthaul interface (not shown in FIG. 5) may facilitate any of S-iq, NG-iq, F1-c, and/or F1-u interfaces in FIG. 5.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Terminology

Brief definitions of terms, abbreviations, and phrases used throughout this application are given below.

The term "determining" and its variants may include calculating, extracting, generating, computing, processing, deriving, modeling, investigating, looking up (e.g., looking up in a table, a database or another data structure), ascertaining and the like. Also, "determining" may also include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on". Additionally, the term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

The terms "connected", "coupled", and "communicatively coupled" and related terms may refer to direct or indirect connections. If the specification states a component or feature "may," "can," "could," or "might" be included or have a characteristic, that particular component or feature is not required to be included or have the characteristic.

The terms "responsive" or "in response to" may indicate that an action is performed completely or partially in response to another action. The term "module" refers to a functional component implemented in software, hardware, or firmware (or any combination thereof) component.

The methods disclosed herein comprise one or more steps or actions for achieving the described method. Unless a specific order of steps or actions is required for proper operation of the method that is being described, the order and/or use of specific steps and/or actions may be modified without departing from the scope of the claims.

In conclusion, the present disclosure provides novel systems, methods, and arrangements for a distributed RAN (e.g., C-RAN) implementing fronthaul operational measurements (OMs). While detailed descriptions of one or more configurations of the disclosure have been given above, various alternatives, modifications, and equivalents will be apparent to those skilled in the art without varying from the spirit of the disclosure. For example, while the configurations described above refer to particular features, functions, procedures, components, elements, and/or structures, the scope of this disclosure also includes configurations having different combinations of features, functions, procedures, components, elements, and/or structures, and configurations that do not include all of the described features, functions, procedures, components, elements, and/or structures. Accordingly, the scope of the present disclosure is intended to embrace all such alternatives, modifications, and variations as fall within the scope of the claims, together with all equivalents thereof. Therefore, the above description should not be taken as limiting.

Example Embodiments

Example 1 includes a distributed radio access network (RAN), comprising: a plurality of radio points (RPs), each being configured to exchange radio frequency (RF) signals with at least one user equipment (UE); a baseband controller communicatively coupled to the plurality of RPs via a fronthaul network, the baseband controller being configured to: determine, for each of the plurality of RPs, a number of successfully received packets on the fronthaul network, for a wireless channel, during a measurement interval; and determine, for each of the plurality of RPs, a number of packet losses, for the wireless channel and during the measurement interval, based on the number of successfully received packets.

Example 2 includes the distributed RAN of Example 1, wherein a particular packet is a successfully received packet only if it is received via the fronthaul network at an expected subframe (SF) and system frame number (SFN).

Example 3 includes the distributed RAN of any of Examples 1-2, wherein a particular packet is a successfully received packet only if it passes a parametric check of one or more parameters in the particular packet after it is received via the fronthaul network.

Example 4 includes the distributed RAN of any of Examples 1-3, wherein the baseband controller is further configured to determine, for each of the plurality of RPs, the number of packets transmitted on the fronthaul network, for the wireless channel, during the measurement interval.

Example 5 includes the distributed RAN of Example 4, wherein the baseband controller is further configured to determine the number of packet losses for the wireless channel, for one of the plurality of RPs, by subtracting the number of successfully received packets for the RP from the number of transmitted packets for the RP.

Example 6 includes the distributed RAN of any of Examples 1-5, wherein the baseband controller is further configured to determine a total number of packet losses for the wireless channel, during the measurement interval, based on the number of packet losses for each of the plurality of RPs.

Example 7 includes the distributed RAN of Example 6, wherein a problem with the distributed RAN is identified based on the total number of packet losses during the measurement interval.

Example 8 includes the distributed RAN of Example 7, wherein the fronthaul network comprises multiple switches, each being configured to communicate with the baseband controller and at least one of the plurality of RPs; and wherein the identified problem is a problem specific to one or more of the switches.

Example 9 includes the distributed RAN of any of Examples 6-8, wherein the baseband controller is further configured to determine the total number of packet losses by summing, for each of the plurality of RPs, a number of packet losses on the fronthaul network, for the wireless channel and the measurement interval.

Example 10 includes the distributed RAN of any of Examples 1-9, wherein the baseband controller is further configured to determine a total number of successfully received packets, during the measurement interval, based on the number of successfully received packets for each of the plurality of RPs.

Example 11 includes the distributed RAN of any of Examples 1-10, wherein the measurement interval spans multiple aggregation intervals; wherein, for each of the plurality of RPs, a respective count of successfully received packets on the fronthaul network, for the wireless channel, is determined during each aggregation interval; wherein the counts for a particular RP are accumulated across the aggregation intervals in the measurement interval to determine the number of successfully received packets on the fronthaul network, for the wireless channel, during the measurement interval.

Example 12 includes a method performed in a distributed RAN comprising a plurality of radio points (RPs) communicatively coupled to a baseband controller via a fronthaul network, the method comprising: determining, for each of the plurality of RPs, a number of successfully received packets on the fronthaul network, for a wireless channel, during a measurement interval; and determining, for each of the plurality of RPs, a number of packet losses, for the wireless channel and during the measurement interval, based on the number of successfully received packets.

Example 13 includes the method of Example 12, wherein a particular packet is a successfully received packet only if it is received via the fronthaul network at an expected subframe (SF) and system frame number (SFN).

Example 14 includes the method of any of Examples 12-13, wherein a particular packet is a successfully received packet only if it passes a parametric check of one or more parameters in the particular packet after it is received via the fronthaul network.

Example 15 includes the method of any of Examples 12-14, further comprising determining, for each of the plurality of RPs, the number of packets transmitted on the fronthaul network, for the wireless channel, during the measurement interval.

Example 16 includes the method of Example 15, further comprising determining the number of packet losses for the wireless channel, for one of the plurality of RPs, by subtracting the number of successfully received packets for the RP from the number of transmitted packets for the RP.

Example 17 includes the method of any of Examples 12-15, further comprising determining a total number of packet losses for the wireless channel, during the measurement interval, based on the number of packet losses for each of the plurality of RPs.

Example 18 includes the method of Example 16, wherein a problem with the distributed RAN is identified based on the total number of packet losses during the measurement interval.

Example 19 includes the method of Example 18, wherein the fronthaul network comprises multiple switches, each being configured to communicate with the baseband controller and at least one of the plurality of RPs; and wherein the identified problem is a problem specific to one or more of the switches.

Example 20 includes the method of any of Examples 17-19, further comprising determining the total number of packet losses by summing, for each of the plurality of RPs, a number of packet losses on the fronthaul network, for the wireless channel and the measurement interval.

Example 21 includes the method of any of Examples 12-20, further comprising determining a total number of successfully received packets, during the measurement interval, based on the number of successfully received packets for each of the plurality of RPs.

Example 22 includes the method of any of Examples 12-21, wherein the measurement interval spans multiple aggregation intervals; and wherein, for each of the plurality of RPs, a respective count of successfully received packets on the fronthaul network, for the wireless channel, is determined during each aggregation interval; wherein the counts for a particular RP are accumulated across the aggregation intervals in the measurement interval to determine the number of successfully received packets on the fronthaul network, for the wireless channel, during the measurement interval.

The invention claimed is:

1. A distributed radio access network (RAN), comprising:
    at least one radio point (RP), each being configured to exchange radio frequency (RF) signals with at least one user equipment (UE); and
    a baseband controller communicatively coupled to the at least one RP via a fronthaul network, the baseband controller being configured to:
        determine, for each of the at least one RP, a number of successfully received packets on the fronthaul network, for a wireless channel, during a measurement interval; and
        determine, for each of the at least one RP, a number of packet losses, for the wireless channel and during the measurement interval, based on the number of successfully received packets.

2. The distributed RAN of claim 1, wherein a particular packet is a successfully received packet only if it is received via the fronthaul network at an expected subframe (SF) and system frame number (SFN).

3. The distributed RAN of claim 1, wherein a particular packet is a successfully received packet only if it passes a parametric check of one or more parameters in the particular packet after it is received via the fronthaul network.

4. The distributed RAN of claim 1, wherein the baseband controller is further configured to determine, for each of the at least one RP, a number of packets transmitted on the fronthaul network, for the wireless channel, during the measurement interval.

5. The distributed RAN of claim 4, wherein the baseband controller is further configured to determine the number of packet losses for the wireless channel, for one of the at least one RP, by subtracting the number of successfully received packets for the RP from a number of transmitted packets for the RP.

6. The distributed RAN of claim 1, wherein the baseband controller is further configured to determine a total number of packet losses for the wireless channel, during the measurement interval, based on the number of packet losses for each of the at least one RP.

7. The distributed RAN of claim 6, wherein a problem with the distributed RAN is identified based on the total number of packet losses during the measurement interval.

8. The distributed RAN of claim 7,
    wherein the fronthaul network comprises multiple switches, each being configured to communicate with the baseband controller and at least one of the at least one RP;

wherein the identified problem is a problem specific to one or more of the switches.

9. The distributed RAN of claim 6, wherein the baseband controller is further configured to determine the total number of packet losses by summing, for each of the at least one RP, a number of packet losses on the fronthaul network, for the wireless channel and the measurement interval.

10. The distributed RAN of claim 1, wherein the baseband controller is further configured to determine a total number of successfully received packets, during the measurement interval, based on the number of successfully received packets for each of the at least one RP.

11. The distributed RAN of claim 1,
wherein the measurement interval spans multiple aggregation intervals;
wherein, for each of the at least one RP, a respective count of successfully received packets on the fronthaul network, for the wireless channel, is determined during each of the aggregation intervals;
wherein the counts for a particular RP are accumulated across the aggregation intervals in the measurement interval to determine the number of successfully received packets on the fronthaul network, for the wireless channel, during the measurement interval.

12. A method performed in a distributed RAN comprising at least one radio point (RP) communicatively coupled to a baseband controller via a fronthaul network, the method comprising:
determining, for each of the at least one RP, a number of successfully received packets on the fronthaul network, for a wireless channel, during a measurement interval; and
determining, for each of the at least one RP, a number of packet losses, for the wireless channel and during the measurement interval, based on the number of successfully received packets.

13. The method of claim 12, wherein a particular packet is a successfully received packet only if it is received via the fronthaul network at an expected subframe (SF) and system frame number (SFN).

14. The method of claim 12, wherein a particular packet is a successfully received packet only if it passes a parametric check of one or more parameters in the particular packet after it is received via the fronthaul network.

15. The method of claim 12, further comprising determining, for each of the plurality of RPs, a number of packets transmitted on the fronthaul network, for the wireless channel, during the measurement interval.

16. The method of claim 15, further comprising determining the number of packet losses for the wireless channel, for one of the at least one RP, by subtracting the number of successfully received packets for the RP from a number of transmitted packets for the RP.

17. The method of claim 12, further comprising determining a total number of packet losses for the wireless channel, during the measurement interval, based on the number of packet losses for each of the at least one RP.

18. The method of claim 17, wherein a problem with the distributed RAN is identified based on the total number of packet losses during the measurement interval.

19. The method of claim 18,
wherein the fronthaul network comprises multiple switches, each being configured to communicate with the baseband controller and at least one of the at least one RP;
wherein the identified problem is a problem specific to one or more of the switches.

20. The method of claim 17, further comprising determining the total number of packet losses by summing, for each of the at least one RP, a number of packet losses on the fronthaul network, for the wireless channel and the measurement interval.

21. The method of claim 12, further comprising determining a total number of successfully received packets, during the measurement interval, based on the number of successfully received packets for each of the at least one RP.

22. The method of claim 12,
wherein the measurement interval spans multiple aggregation intervals;
wherein, for each of the at least one RP, a respective count of successfully received packets on the fronthaul network, for the wireless channel, is determined during each of the aggregation intervals;
wherein the counts for a particular RP are accumulated across the aggregation intervals in the measurement interval to determine the number of successfully received packets on the fronthaul network, for the wireless channel, during the measurement interval.

* * * * *